United States Patent [19]

Hung

[11] Patent Number: 5,296,923
[45] Date of Patent: Mar. 22, 1994

[54] COLOR IMAGE REPRODUCING DEVICE AND METHOD

[75] Inventor: Po-Chieh Hung, Rochester, N.Y.

[73] Assignee: Konica Corporation, Tokyo, Japan

[21] Appl. No.: 639,261

[22] Filed: Jan. 9, 1991

[51] Int. Cl.$^5$ .............................................. H04N 1/46
[52] U.S. Cl. ..................... 358/527; 358/406; 358/500
[58] Field of Search ............... 358/406, 75, 80, 78; 382/41, 42; 395/131; H04N 1/46

[56] References Cited

U.S. PATENT DOCUMENTS

| | | | |
|---|---|---|---|
| 4,486,772 | 12/1984 | Klie et al. | 358/80 |
| 4,837,722 | 6/1989 | Sara | 364/723 |
| 4,992,862 | 2/1991 | Gabor | 358/80 |
| 5,121,196 | 6/1992 | Hung | 358/80 |

Primary Examiner—Edward L. Coles, Sr.
Assistant Examiner—Jill Jackson
Attorney, Agent, or Firm—Jordan B. Bierman

[57] ABSTRACT

A color image reproducing device comprising a scanner, a color value memory, a scanner signal memory, a conversion element, and the adjusting element. Each memory stores standard color values derived from reference color values and standard scanner signals derived from reference scanner signals. The reference color values and reference scanner signals are obtained by measuring both by a colorimeter and by scanning of color patches. The color values are derived from measured scanner signals of an original based upon correspondence between standard color values and standard scanner signals. Finally, the device adjusts relative color balance by controlling the intensity of outputs based upon the color values.

39 Claims, 12 Drawing Sheets

Table of contents of LUT(3)

| Ct | 0 | | 1 | | 2 | | 3 | |
|---|---|---|---|---|---|---|---|---|
| | W | Pr Pg Pb | W | Pr Pg Pb | W | Pr Pg Pb | W | Pr Pg Pb |
| Lr ≧ Lg ≧ Lb | 8-Lr | 0 0 0 | Lr-Lg | 1 0 0 | Lg-Lb | 1 1 0 | Lb | 1 1 1 |
| Lr ≧ Lb > Lg | 8-Lr | 0 0 0 | Lr-Lb | 1 0 0 | Lb-Lg | 1 0 1 | Lg | 1 1 1 |
| Lb > Lr ≧ Lg | 8-Lb | 0 0 0 | Lb-Lr | 0 0 1 | Lr-Lg | 1 0 1 | Lg | 1 1 1 |
| Lb > Lg ≧ Lr | 8-Lb | 0 0 0 | Lb-Lg | 0 0 1 | Lg-Lr | 0 1 1 | Lr | 1 1 1 |
| Lg ≧ Lb > Lr | 8-Lg | 0 0 0 | Lg-Lb | 0 1 0 | Lb-Lr | 0 1 1 | Lr | 1 1 1 |
| Lg ≧ Lr > Lb | 8-Lg | 0 0 0 | Lg-Lr | 0 1 0 | Lr-Lb | 1 1 0 | Lb | 1 1 1 |

FIG. 11d

COLOR IMAGE REPRODUCING DEVICE AND METHOD

FIELD OF THE INVENTION

The present invention relates generally to reproduction of a color image of an original by a scanner.

BACKGROUND OF THE INVENTION

Color image reproducing devices such as a color electric photographic copy machines, systems of processing silver halide color photographic light-sensitive materials, cathode ray tubes, and systems of printing are all well known in the art. A color scanner is a device used to detect the color images. The scanner outputs a signal in the form of RGB (Red, Green, and Blue) signals for the color image; however, these signals do not provide any absolute colorimetric information; they indicate only relative values; i.e. the color is more (or less) reddish (greenish, or bluish).

To handle color precisely, some physical definition and values are needed. According to CIE definitions, Color Matching Functions, which correspond almost exactly to the spectral sensitivities of the human eyes, are used to calculate tristimulus values, which are represented by the three letters X, Y and Z, and which are called color values. These values represent the visual perception and are the basis for any color manipulations.

A device and method which can obtain accurate color values, which are precisely in accord with the visual perceptions of the human eye, are highly desirable.

In the prior art, there were two approaches for obtaining color values. One is to adjust the total scanner spectral sensitivities to one set of linear transformations of human sensitivities (the Luther condition), the other is to establish the relationship between the input scanner signals (RGB) and the color values, such as XYZ, CIE-LUV, CIELAB, or any other three or more values which can represent the total color.

Figure 1A:
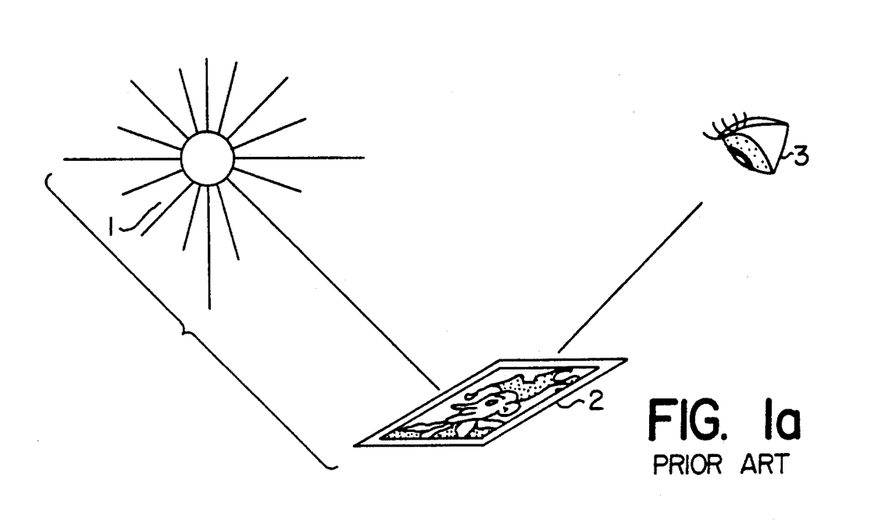
FIGS. 1a and 1b shows the components of human vision and machine vision.
Figure 1B:
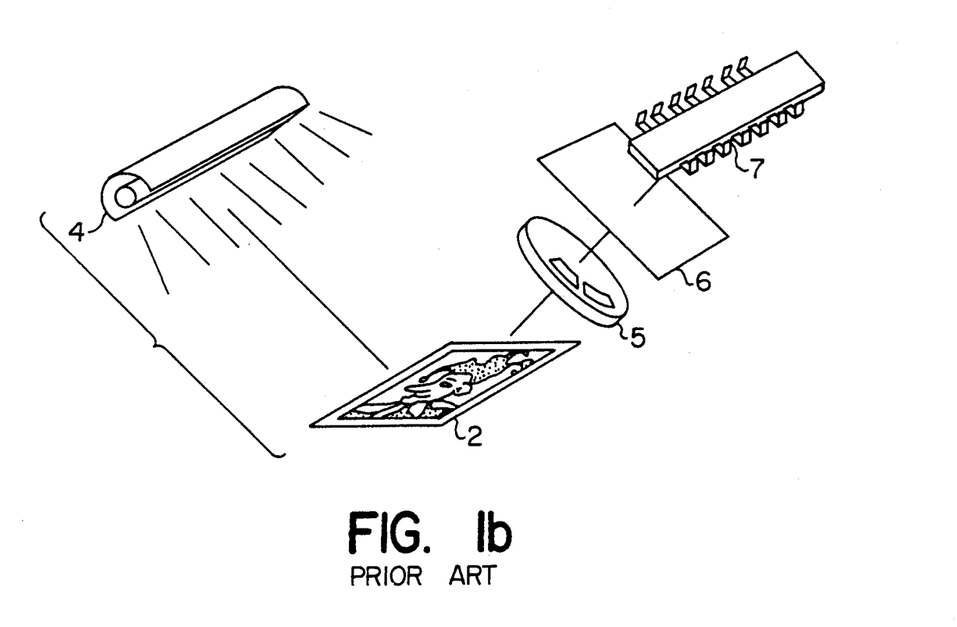

FIG. 1 shows components of human vision and machine vision. In human vision, a light reflects from object 2 and reaches human eye 3. Analogously, in the machine vision (scanner), artificial light 4 reflects on object 2 and reaches detector 7 through lenses 5 and filters 6.

Figure 2A:
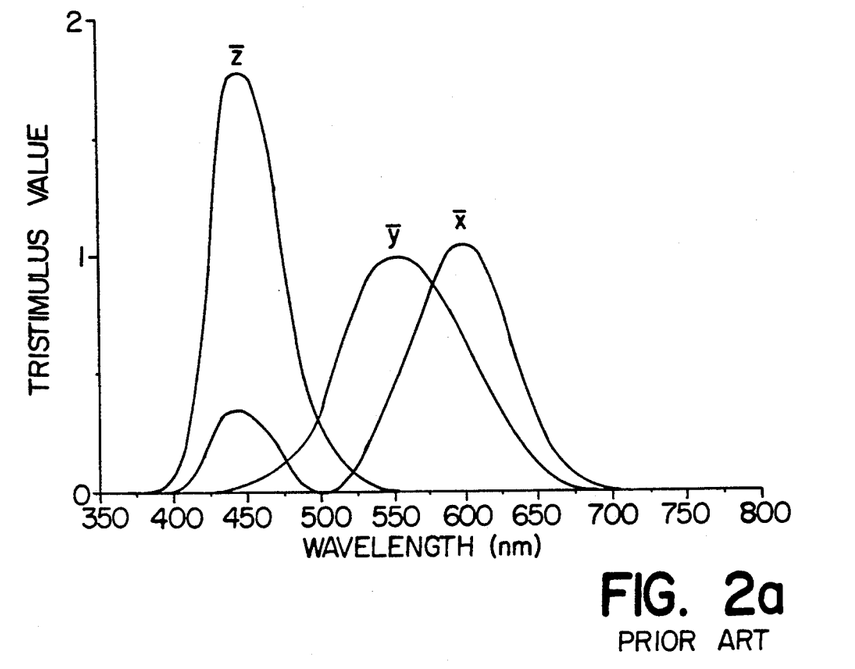
FIGS. 2a and 2b shows examples of the Color Matching Functions.
Figure 2B:
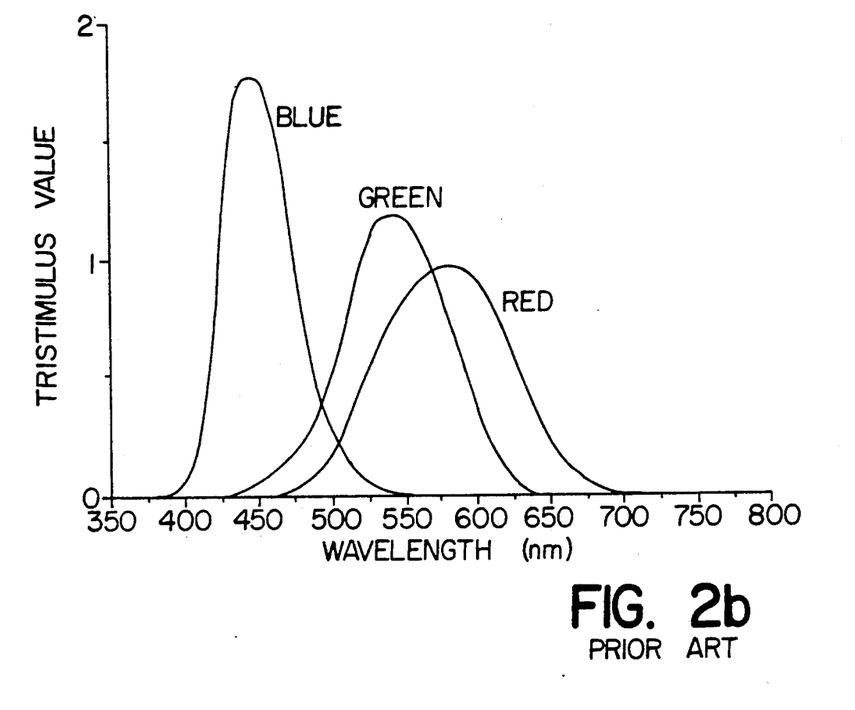

If the scanner has the same spectral response as the human eye, the signals from the scanner could be transformed into tristimulus values (XYZ) by a matrix and could be changed to another color of the desired values. Two examples are shown in FIG. 2; one is the Color Matching Functions which have been defined by CIE (Commission Internationale de l'Eclairage) to calculate the standard color values (XYZ or tristimulus values). These are used for representation of colors by physical values instead of names, such as blue, green, yellow, etc. The other is its linear transformation to provide one peak and the narrowest curve. One can calculate the color values from the scanner signals by a simple linear matrix multiplication.

However, practically speaking, matching the total sensitivities to the Luther condition is very difficult because bright illumination (especially fluorescent light) tends to have sharp spikes in its spectral power distribution although the desired total sensitivity curves are smooth. The sensitivities of CCD (charged coupled device), which is often used as a sensor, has jagged spectral sensitivity curves. Theoretically these shapes of the spectral curves can be compensated for by filters, but making filters which cancel the spikes and jagged spectral sensitivities is very difficult. Even if such filters are created, they may be ineffective because reducing the strong spikes will make the illumination much dimmer. Therefore, in practice, it is almost impossible to adapt the total sensitivities of the scanner to coincide with the Luther condition. In addition, a scanner matching the Luther condition has a bad chroma S/N ratio because two of the three sensitivities in FIG. 2 are so close (in sense of the low S/N ratio, three monochromatic sensitivities are ideal, but of course, this kind of scanner is far from the Luther condition).

On the other hand, regressions to establish the relationship between scanner signals and color values have been attempted. However, this relationship is essentially non-linear and there is no way to pick up the non-linear terms on rational basis; it is very difficult to fit the 3 dimensional relationship with non-linear terms chosen at random.

SUMMARY OF THE INVENTION

The object of the present invention is to provide a color image reproducing device and method which reproduce accurately the color of an original.

Another object of the present invention is to provide a color image reproducing device and method which operates simply and quickly.

Another object of the present invention is to provide a color image reproducing device and method which can be applied to any kind of reproducing device.

The color image reproducing device of the present invention comprises a scanner, a color value memory, a scanner signal memory, a conversion element, and the adjusting element.

Each memory stores standard color values derived from reference color values and standard scanner signals derived from reference scanner signals. The reference color values and reference scanner signals are obtained by measuring both by a colorimeter and by scanning of color patches. The color values are derived from measured scanner signals of an original based upon correspondence between standard color values and standard scanner signals. Finally, the device adjusts relative color balance by controlling intensity of outputs based upon the color values.

DETAILED DESCRIPTION OF THE INVENTION

Preferred embodiments of the present invention will now be described in detail with reference to the accompanying drawings.

Figure 3A:
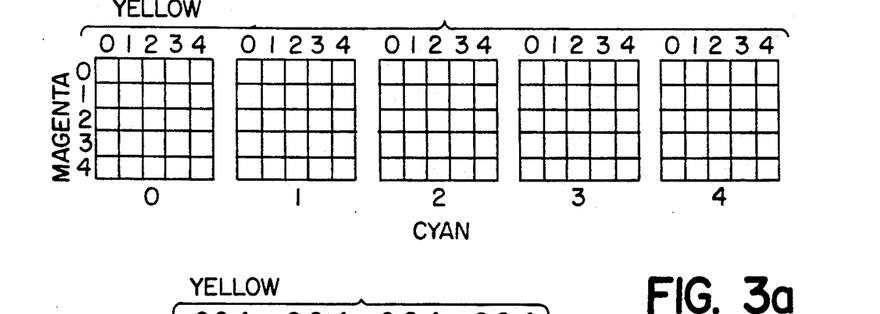
FIGS. 3(a) and 3(b) are examples of color patches which can be used in the present invention.
Figure 3B:
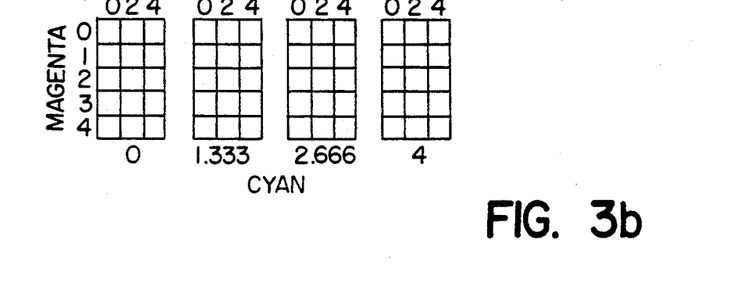

FIGS. 3(a) and 3(b) show color patches which are combinations of Cyan, Magenta and Yellow (or with Black). The color patches should be made on the same medium that is actually to be used; e.g. photographic paper. Make the desired color patches by an electronic printer as follows:

1. Gradation increasing color intensity (step wedge)

a. Steps of each color (cyan, magenta, or yellow) are evenly placed in a color gamut.

These color patches are evenly spread over the entire output color gamut. Omitting this procedure reduces the accuracy of the calculations. The preferable number of the gradation is five, including two for maximum and minimum densities. The greater the number, the less the error. Five gradations for each color are suitable for manual measuring.

b. Make all combinations of the three sets of the gradation form the image on the specified medium.

If there are 5 gradations, the total number of patches are 125 ($=5\times5\times5$), as shown in FIG. 3(a). Of course, a different number of gradations can be used such as, four steps for cyan, five steps for magenta, and three steps for yellow. In this case, the total number of patches is 60 ($=4\times5\times3$), as shown in FIG. 3(b).

Figure 6A:
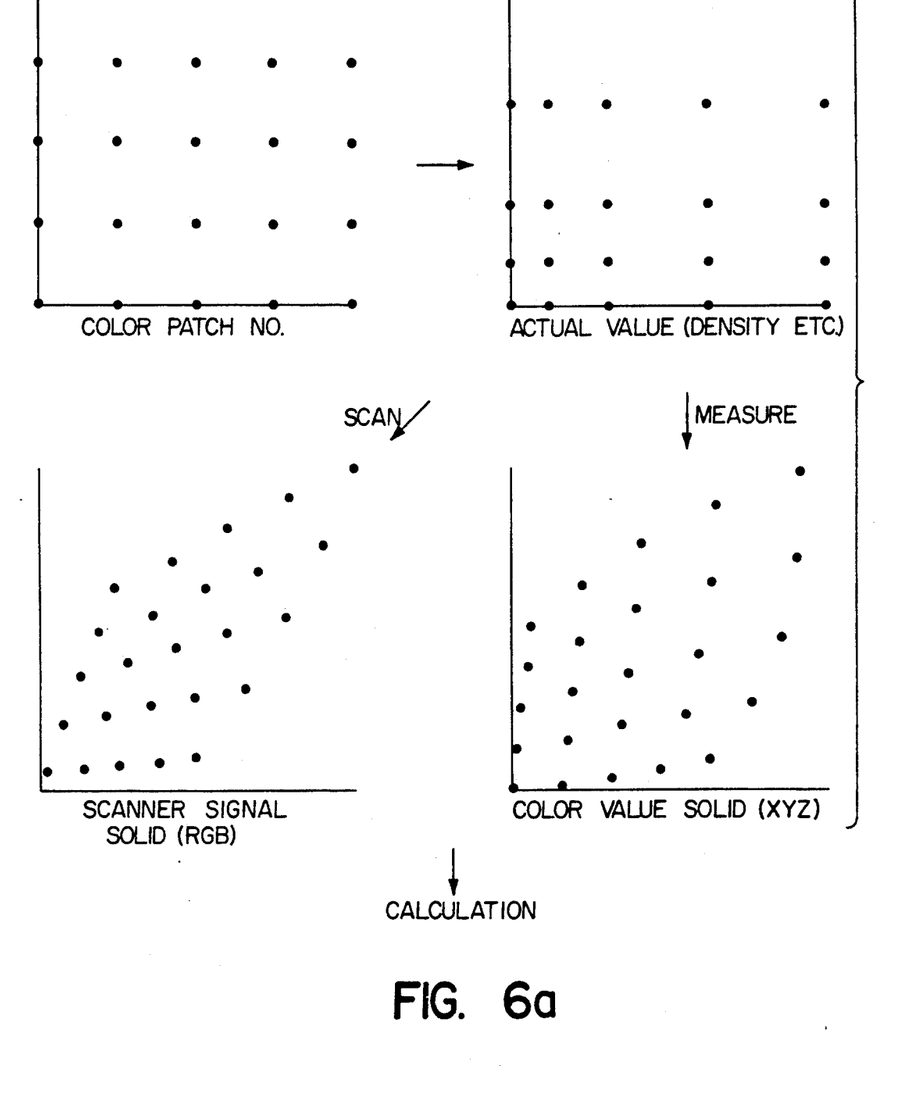
FIGS. 6(a), 6(b) and 6(c) show the correspondence between reference and standard color values and reference and standard scanner signals in accordance with the present invention.

2. Measure the colorimetric values for the patches by a colorimeter (FIG. 6(a), lower right). These values are defined as reference color values.

The color patches are measured by a colorimeter with proper geometry. The data has three values such as XYZ, or tristimulus values or transformations (i.e. CIELUV, CIELAB etc.).

3. Scan the same color patches by the scanner and get the scanner signals for each patch (Red, Green and Blue) (FIG. 6(a), lower left). These signals are defined as reference scanner signals.

The same color patches are scanned by the scanner and find the scanner signal such as red, green, and blue. In this process, scanning many times and taking an average is better than single scanning because scanners have a certain amount of signal noise, which is particularly a problem as to dark color.

4. Calculations

As a result, two sets of the $5\times5\times5\times3$(XYZ) and RGB) data are obtained. The next step is to get the XYZ data on the regular lattice of RGB. A dense grid leads to high accuracy. An extreme idea is to calculate all combinations of signals, which is $256\times256\times256$ in eight bit systems; however, this is not realistic because the memory capacity is limited. The spacing of the lattice may be determined based on such factors as cost, speed, and accuracy.

a. Interpolations to increase the number of scanner signals.

Figure 4:
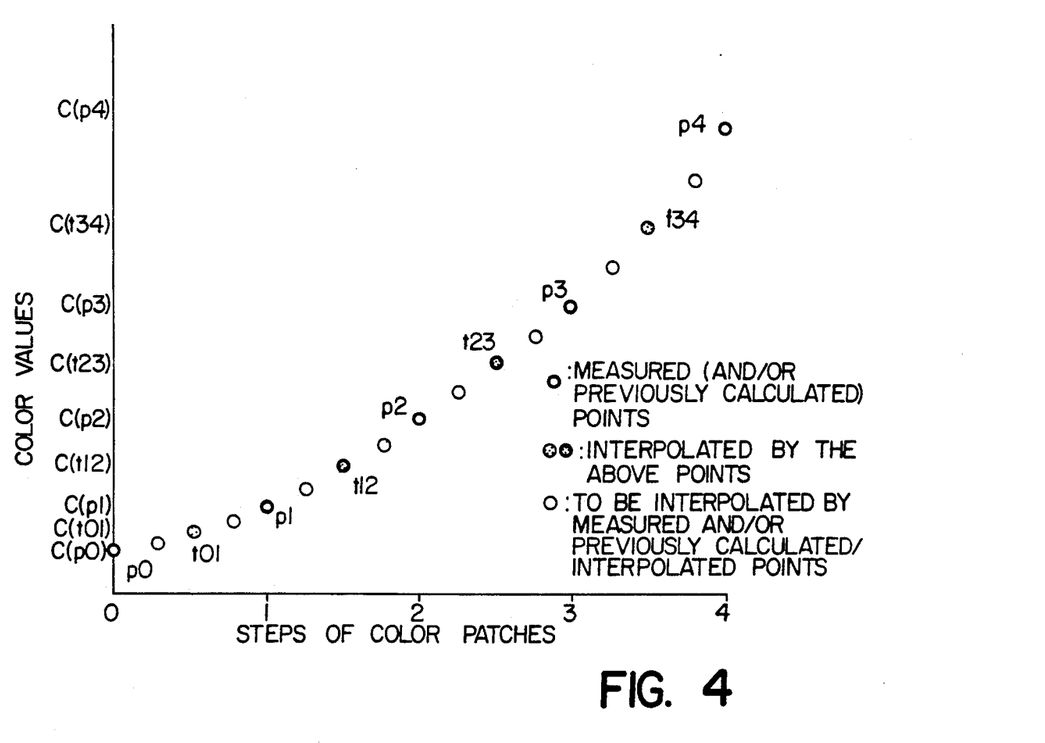
FIG. 4 is an example of non-linear, one dimensional interpolation which can be used in the present invention.
Figure 5A:
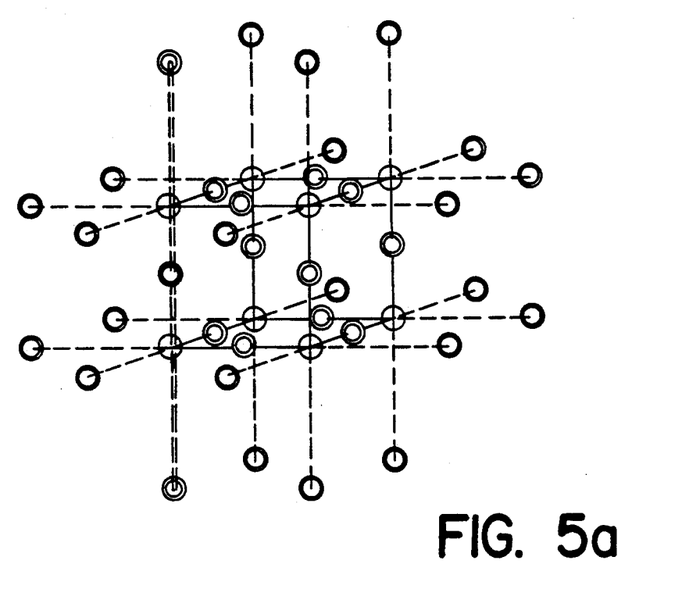
FIGS. 5(a), 5(b) and 5(c) are examples of non-linear three-dimensional, interpolations of the present invention.
Figure 5B:
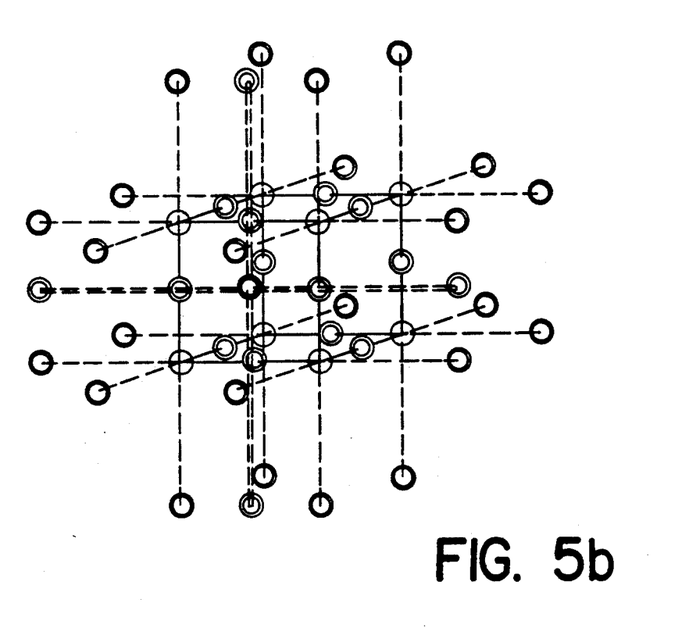
Figure 5C:
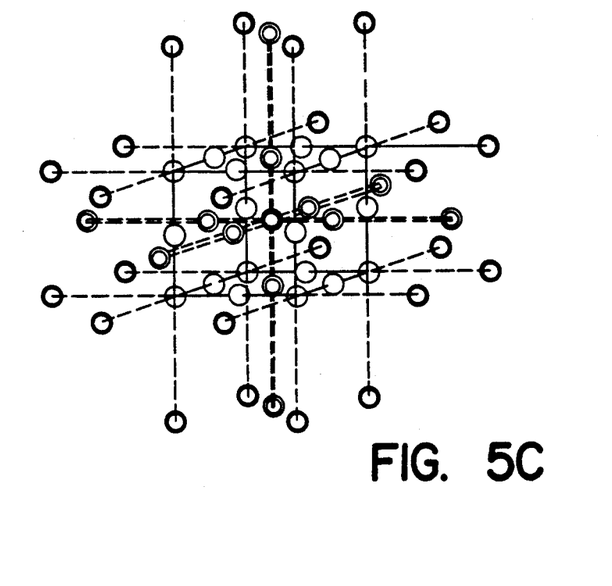

Stepwise non-linear interpolations are applied to increase the corresponding data points between XYZ and RGB from $5\times5\times5$ to $9\times9\times9$, from $9\times9\times9$ to $17\times17\times17$, and from $17\times17\times17$ to $33\times33\times33$ (FIG. 4 1-dimensional interpolations, FIGS. 5 (a to c) show the interpolations on a cube).

First, points on the lines are interpolated as shown in FIG. 4 and FIG. 5(a). In this example, the 3rd order polynominal equation is applied. After the calculation of the whole points on the lines, points on surface of cubes are interpolated the same way. To get the points of the surface, there are two ways (vertical and horizontal, according to FIG. 5(b), so that the final values are the average thereof. After these calculations for the points on the surfaces, the center points of the cubes are interpolated and determined from an average of three ways.

Figure 6B:
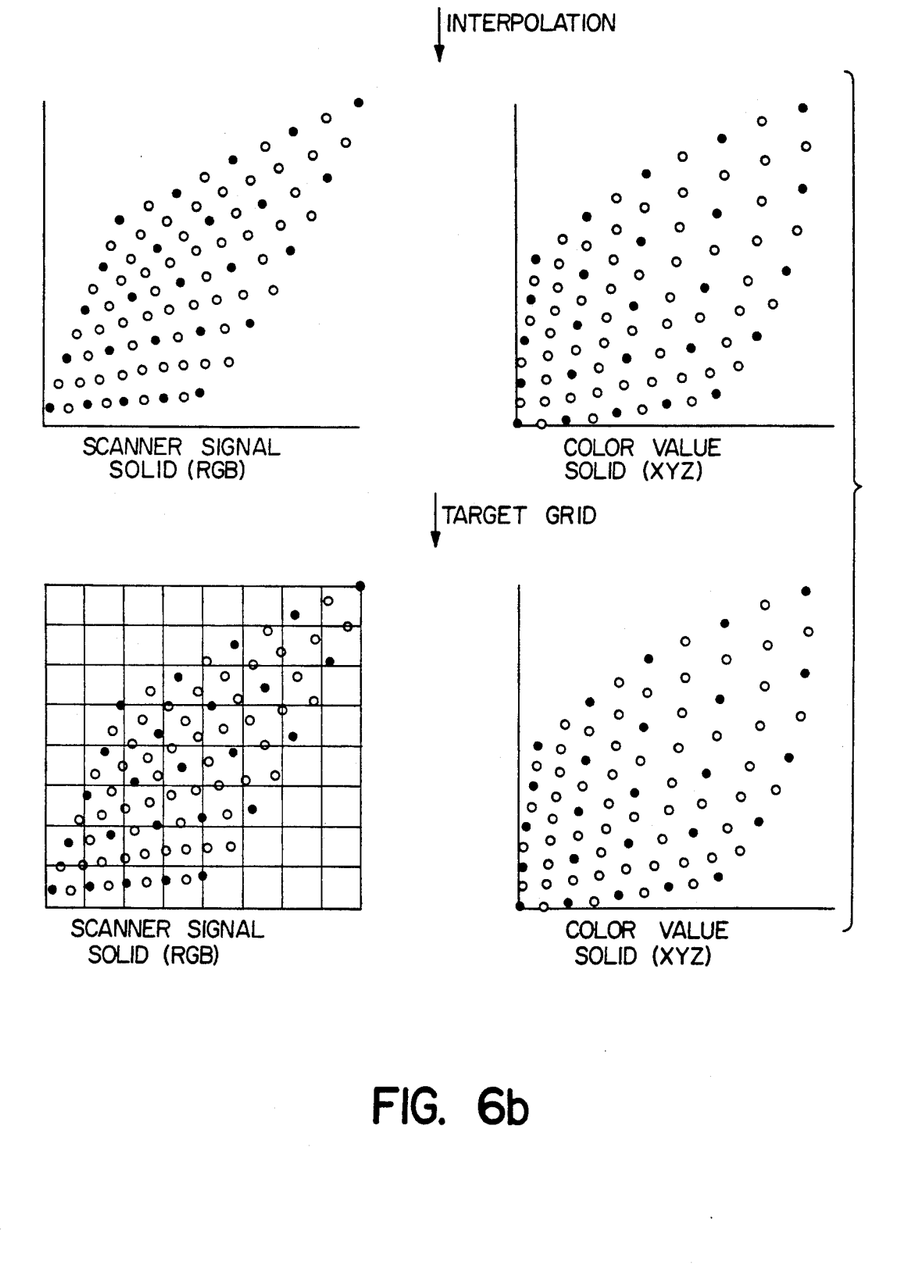

These calculations are repeated to increase the corresponding points from $5\times5\times5$ to $9\times9\times9$, from $17\times17\times17$, and from $17\times17\times17$ to $33\times33\times33$. Finally, the number of the data sets will be 35937 ($=33\times33\times33$). The greater the number of the data sets, the less the error. Choosing another number of data sets is optional. Generally, if the total sensitivities of the scanner are close to the Luther condition, the number of data sets may be decreased without losing accuracy. These color values and scanner signals define a color value solid and scanner signal solid, respectively.

b. Assignment of standard color values (FIG. 6(b), lower)

Standard scanner signals are derived from reference scanner signals by calculating the coordinate of node points of a grid (regular lattice) in the scanner signal solid encompassed by the grid.

c. Interpolations for the nodes inside the signal gamut (FIG. 6(c), upper)

Figure 6C:
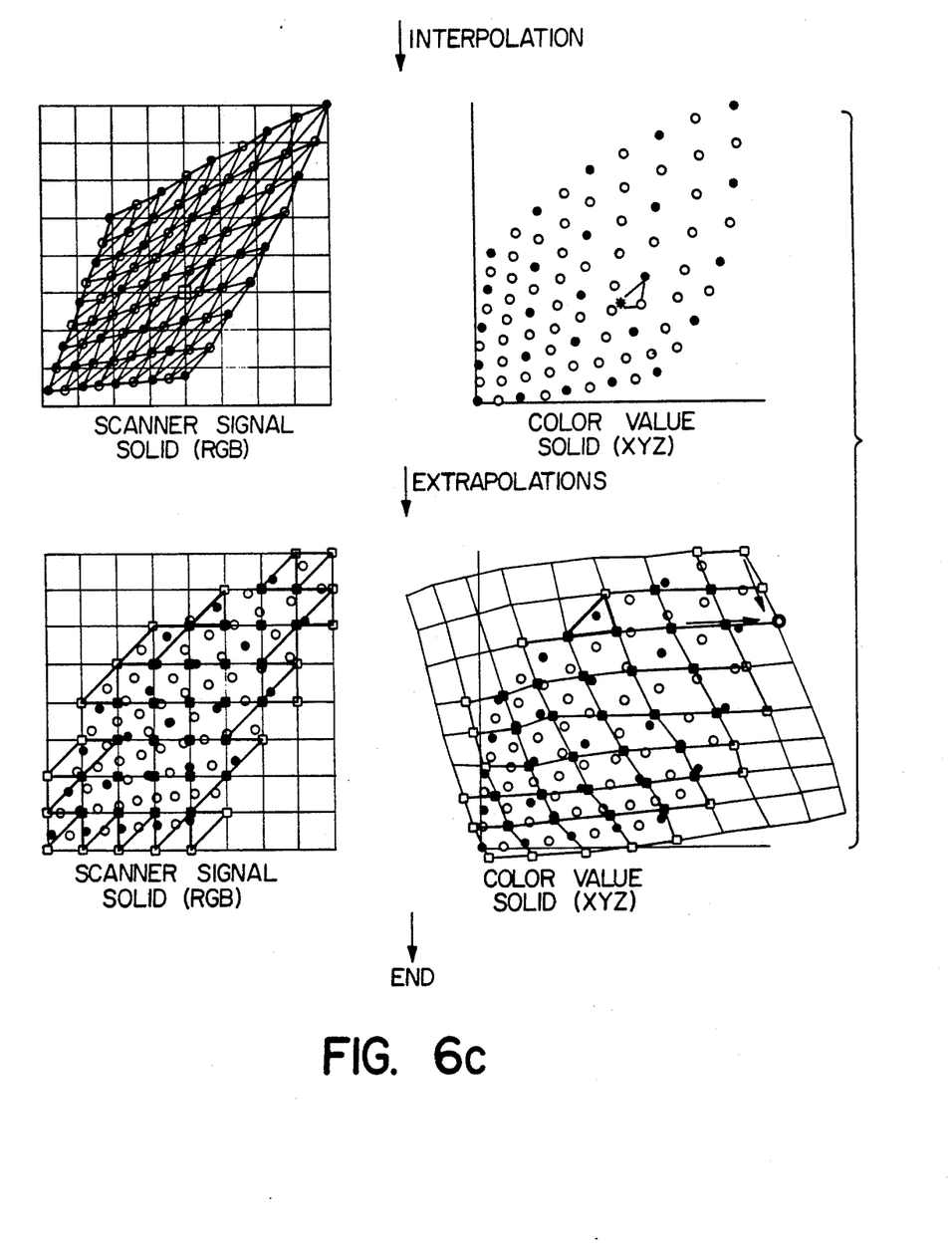

To determine the standard color values which correspond to the standard scanner signals, the scanner signal solid and the color value solid are divided into many tetrahedral sub solids by the nodes of the data set, as shown in the figures. If standard scanner signals, which are nodes of the regular lattice of the scanner signal solid, are given, each node is in a specific tetrahedron.

To decide whether the node is included in the tetrahedron, the relationship between the node and four planes which compose the tetrahedron can be checked. If the node is in the same direction for the four planes as the average point of the four corners of the tetrahedron, the node is in the tetrahedron, because the average point must be in the tetrahedron.

Figure 7:
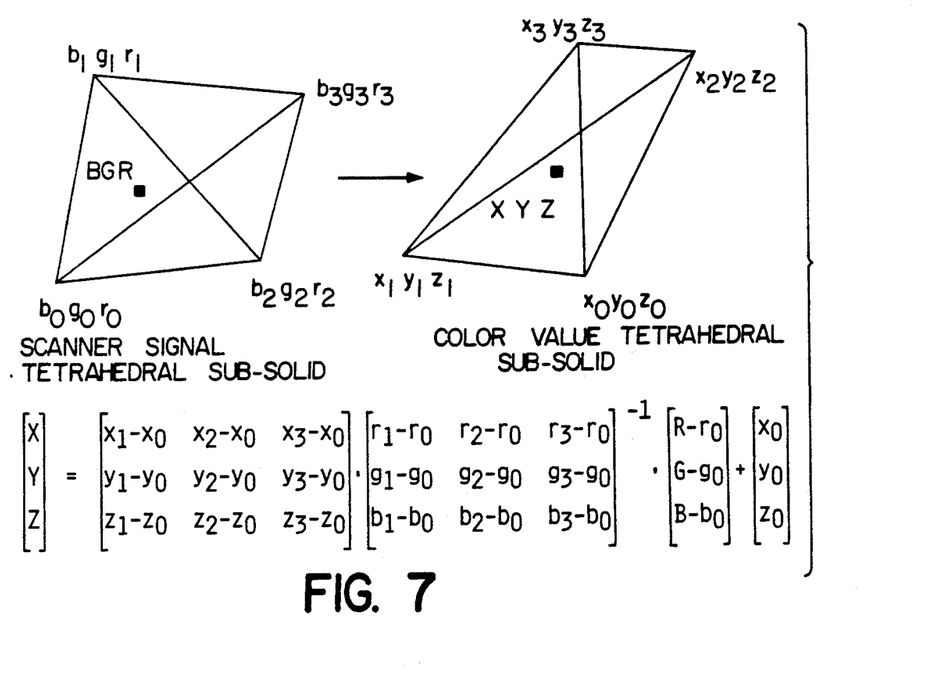
FIG. 7 is an example of the matrix calculation to obtain the set of color values from the sets of scanner signals.

Once the tetrahedron is found, the corresponding values in the color value solid which means standard color values, can be calculated as in FIG. 6(c), upper-right by a matrix calculation (see FIG. 7). This method determines the color value tetrahedron sub-solid including the node which is represented by the set of color values and calculates the corresponding color value. It is applied to all nodes in the signal space.

d. Extrapolations for the nodes outside the signal gamut (FIG. 6(c), lower)

Extrapolations are applied for the nodes outside the signal gamut. The reasons the extrapolations are necessary are (1) due to the method of production of the color patches, the signal gamut does not necessarily indicate the exact absolute signal gamut, (2) since the usual scanners have noise which may be added into the image signal, there is a possibility that the scanned data may exceed the supposed signal gamut, (3) if the interpolation is used to convert from the scanner signals to color values by an interpolation method, the data on the whole lattice is necessary, even outside of the supposed signal gamut.

There are two types of the extrapolations: one is the tetrahedral extrapolation for the nodes which satisfy some conditions ("accurate extrapolation") and the other is the extrapolation using the node on the regular lattice of the scanner signal solid for the rest ("rough extrapolation").

Figure 8:
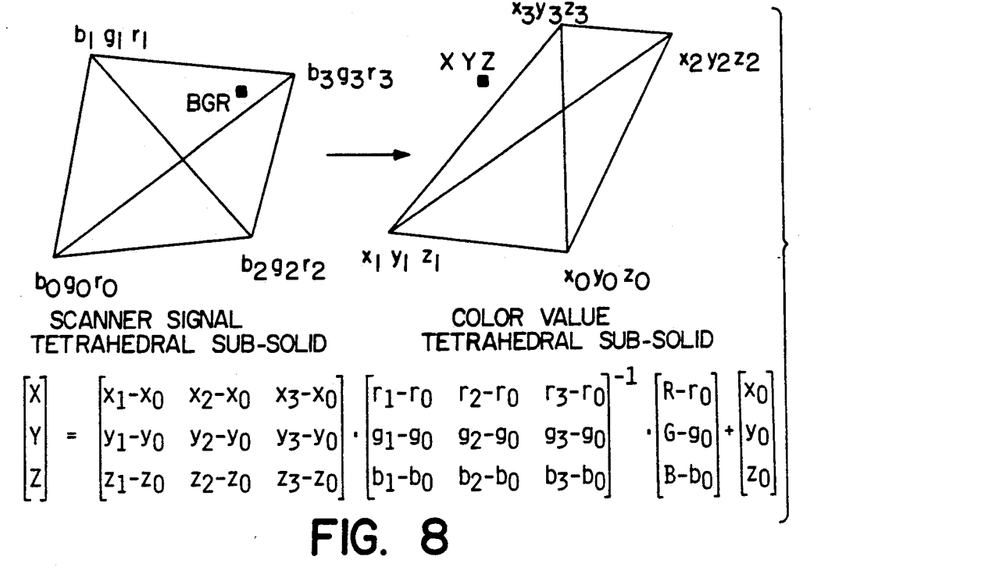
FIG. 8 is an example of matrix calculation to obtain the sets of color values from the sets of scanner signals.

The former extrapolation is an extension of tetrahedral interpolation. If a node on the regular lattice of the scanner signal solid which has all of the neighbor nodes are already calculated by the above interpolation, and there is a point calculated or measured in process (4-a) above in the tetrahedron comprising the remaining point and its neighbors, the color values of the node are be calculated by linear extrapolation (see FIG. 8). This algorithm may be applied to the nodes near surface of the signal gamut. This type of extrapolation is more accurate than the following one.

The latter extrapolation is applied to the rest of the nodes. These are extrapolated by using two points near the gamut surface in a linear direction outwardly. These calculated standard color values are stored in the color value memory, and standard scanner signals are stored in the scanner signal memory.

e. Practical transformation from the scanner signals to the color values.

Figure 9A:
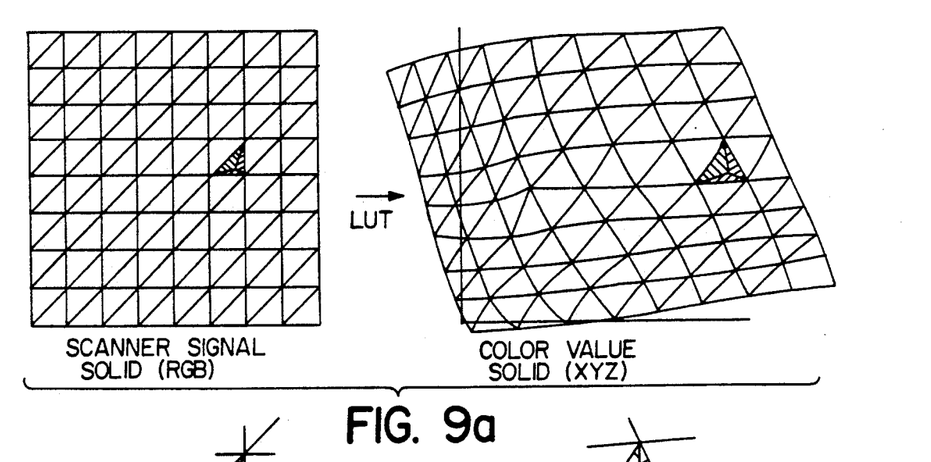
FIGS. 9a and 9b illustrates a practical use of the data by tetrahedral interpolation.
Figure 9B:
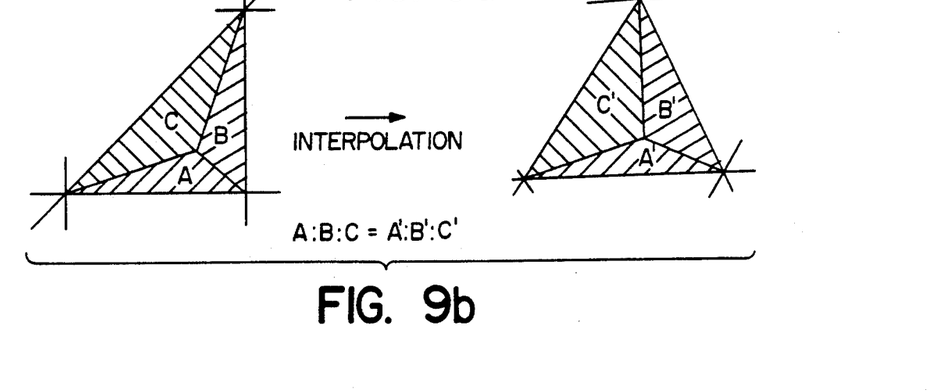
Figure 10:
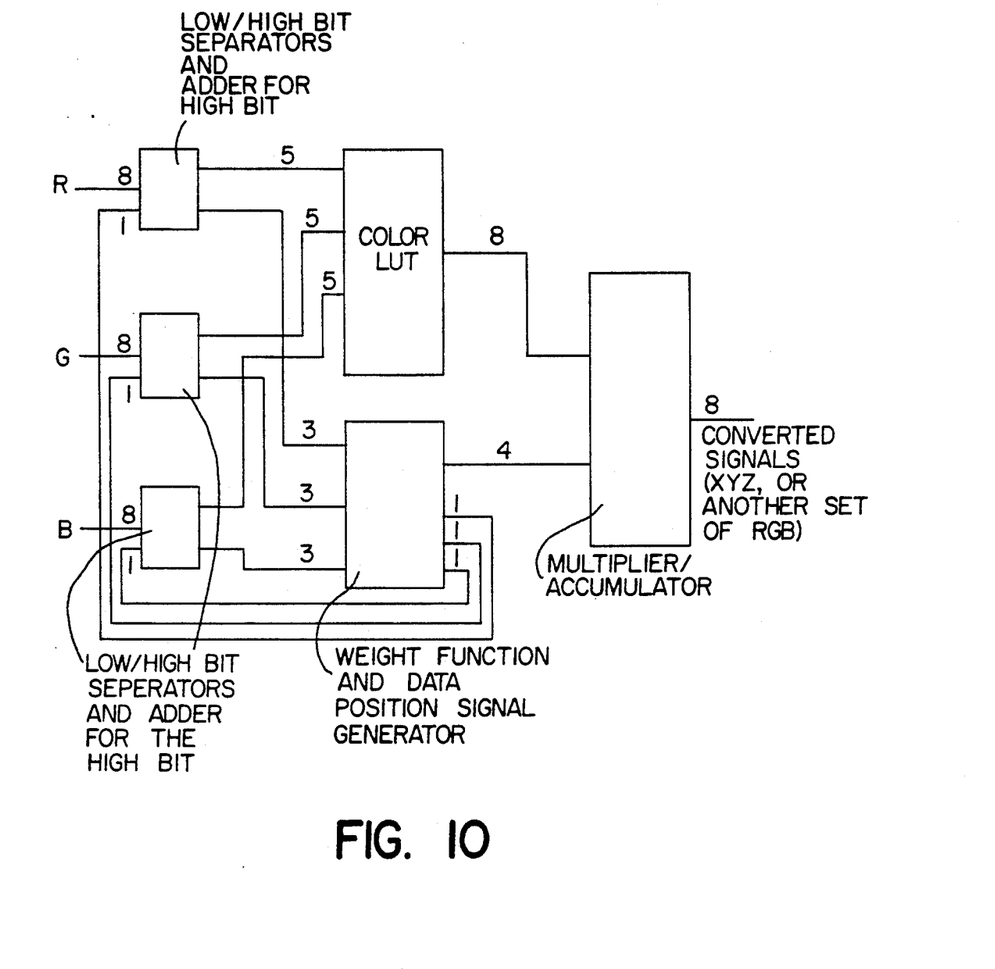
FIG. 10 is block diagram of the tetrahedral interpolation hardware of the present invention.

By using this regular grid and color values, arbitrary scanner signals are converted to the color values as shown in FIG. 9. Hardware for this calculation which is suitable for imaging devices is shown in FIG. 10. The "Color LUT" (lock-up-table) will contain the standard scanner signals and standard color values.

There is another transformation method to calculate the color values by using matrix calculations shown in FIG. 7.

If a large memory is available, the data can be in a look-up-table. In this case, no calculations are necessary. This method can be used for a fairly low quality imaging device such as color copying machine using toner and a CRT display.

Referring more particularly to FIGS. 10 and 11, the operation of the process in conjunction with the hardware is set forth. The following is an example of the inventive combination.

Assumptions $R = 135$ $G = 14$ $B = 59$

LUT(Ur, Ug, Ub) is stored in the LUT(2), which contains the data calculated by previously described algorithm.

It is assumed that one color value (such as red) is going to be interpolated; therefore, signal "sel" has a value of 0 to 2. For example, 0 is red, 1 is green, and 2 is blue.

Procedure

Step 1

RGB values are divided into upper and lower bits, so that LUT(1) outputs;

$Ur = 16, Lr = 7$ $Ug = 1, Lg = 6$ $Ub = 7, Lb = 3$

Figure 11A:
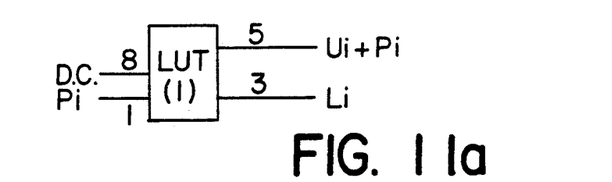
FIGS. 11a, 11b, 11c, and 11d shows components of the hardware of the present invention.
Figure 11B:
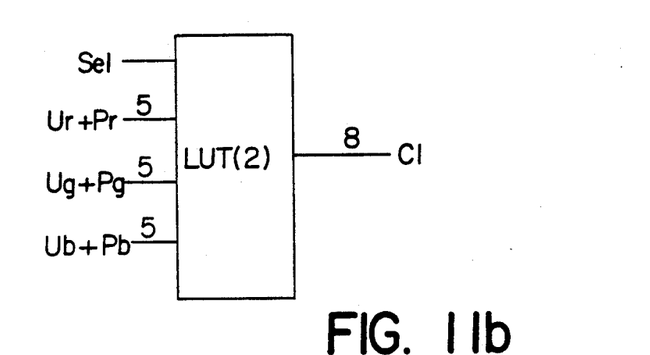
Figure 11C:
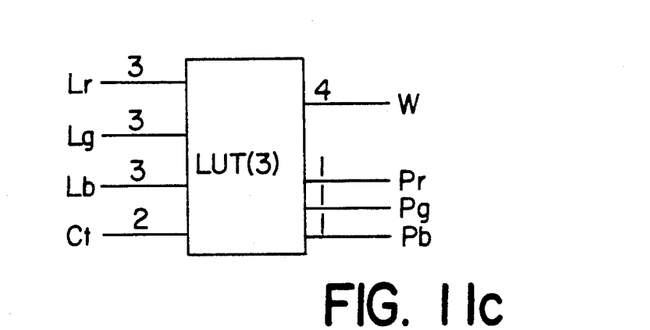
Figure 11D:
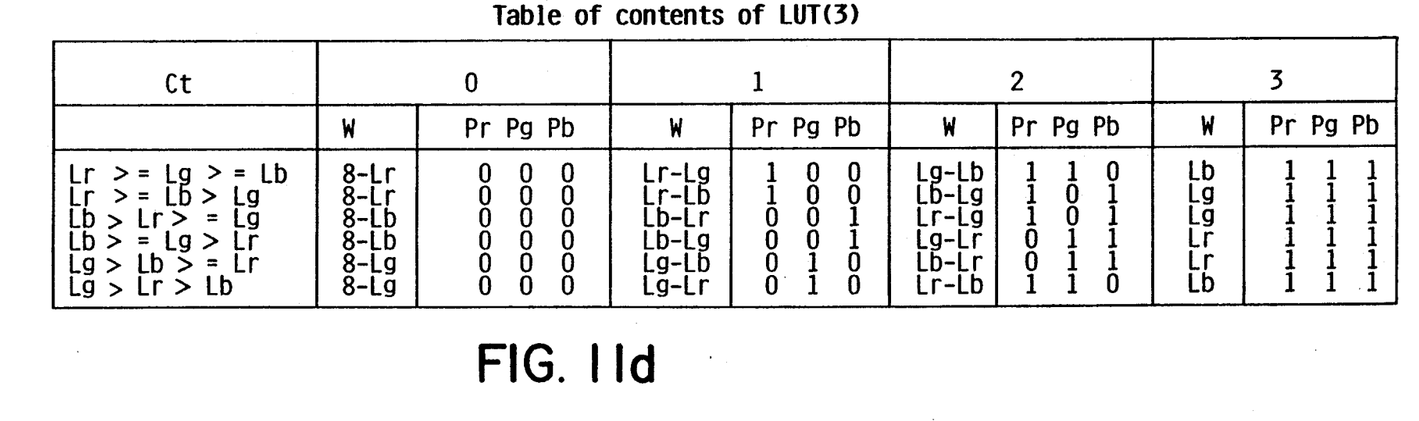

According to the table, LUT(3) outputs (in this case, $Ct = 0$);

$W = 8 - Lr = 8 - 7 = 1$ $Pr = 0, Pg = 0, Pb = 0$

The above data is inputed into LUT(1) so that, LUT(1) outputs $Ur + Pr = 16, Lr = 7$ $Ug + Pg = 1, Lg = 6$ $Ub + Pb = 7, Lb = 3$ The LUT(2) outputs a value on the node $LUT(Ur, Ug, Ub) = LUT(16, 1, 7)$ The multiplier and accumulator receive the two values, LUT(16,1,7) and W=1, so that $LUT(Ur, Ug, Ub) \cdot W = LUT(16,1,7) \cdot 1$ is stored in the accumulator.

Step 2

RGB values are divided into upper and lower bits, so that LUT(1) outputs $Ur = 16, Lr = 7$ $Ug = 1, Lg = 6$ $Ub = 7, Lb = 3$ According to the table, LUT(3) outputs (in this case, $Ct. = 1$);

$W = Lr - Lg = 7 - 6 = 1$ $Pr = 1, Pg = 0, Pb = 0$

The above data is inputed into LUT(1), so that LUT(1) outputs $Ur + Pr = 17, Lr = 7$ $Ug + Pg = 1, Lg = 6$ $Ub + Pb = 7, Lb = 3$ The LUT(2) outputs a value on the node $LUT(Ur, Ug, Ub) = LUT(17, 1, 7)$ The multiplier and accumulator receive two values, LUT(17,1,7) and W=1, so that (value in the accumulator)+LUT(Ur, Ug, Ub)·W=[LUT(16,1,7)·1]+LUT(17,1,7)·1 is stored in the accumulator.

Step 3

RGB values are divided into upper and lower bits, so that LUT(1) outputs

Ur=16,Lr=7

Ug=1,Lg=6

Ub=7,Lb=3

According to the table, LUT(3) outputs (in this case, Ct=2);

W=Lg−Lb=6−3=3

Pr=1,Pg=1,Pb=0

The above data is inputed into LUT(1), so that LUT(1) outputs

Ur+Pr=17,Lr=7

Ug+Pg=2,Lg=6

Ub+Pb=7,Lb=3

The LUT(2) outputs a value on the node

LUT(Ur,Ug,Ub)=LUT(17,2,7)

The multiplier and accumulator means the two values, LUT(17,2,7) and W=3, so that [value in the accumulator]+LUT(Ur, Ug, Ub)·W=[LUT(16, 1,7)·1+LUT(17,1,7)·1]+LUT(17,2,7)·3 is stored in the accumulator.

Step 4

RGB values are divided into upper and lower bits, so that LUT(1) outputs;

Ur=16,Lr=7

Ug=1,Lg=6

Ub=7,Lb=3

According to the table, LUT(3) outputs (in this case, Ct=2);

W=Lb=3=3

Pr=1,Pg=1,Pb=1

The above data is inputed into LUT(1) so that, LUT(1) outputs

Ur+Pr=17,Lr=7

Ug+Pg=2,Lg=6

Ub+Pb=8,Lb=3

The LUT(2) outputs a value on the node

LUT(Ur,Ug,Ub)=LUT(17,2,8)

The multiplier and accumulator receives the two values, LUT(17, 2, 8) and W=3, so that [value in the accumulator]+LUT(Ur, Ug, Ub)·W=[LUT(16,1,7)·1+LUT(17,1,7)·1+LUT(17,2,7)·3]+LUT(17,2,8)·3 is stored in the accumulator.

Step 5

The data in accumulator (usually more than 12 bits) is outputed to the port. The upper 8 bit is shifted three bits, which is equivalent to the value divided by 8. This data is the answer of the interpolation.

I claim:

1. A color image reproducing device comprising:
   (a) a scanner for scanning an original and producing a first signal corresponding thereto;
   (b) a scanner signal memory for storing a plurality of sets of standard scanner signals used to convert said first signal to a second signal, wherein said sets of standard scanner signals in a signal gamut of a plurality of sets of reference scanner signals obtained by scanning color patches with said scanner is determined by an interpolation based on said sets of reference scanner signals, and said sets of standard scanner signals outside of said signal gamut are determined by an extrapolation based on said sets of standard scanner signals determined by said sets of reference scanner signals;
   (c) a color value memory for storing a plurality of sets of standard color values wherein said set of standard color values corresponding to said sets of standard scanner signals in a signal gamut of a plurality of sets of reference scanner signals are determined by said interpolation based on a plurality of sets of reference color values obtained by measuring said color patches with a colorimeter and corresponding to said sets of reference scanner signals, and said sets of standard scanner signals encompassed by said sets of reference scanner signals and standard color values corresponding to said sets of standard scanner signals outside of said signal gamut is determined by said extrapolation based on said sets of standard color values determined by said sets of reference color values and said sets of standard scanner signals.

2. The device of claim 1 wherein said color value memory and said scanner signal memory are the same memory bank.

3. The device of claim 1 comprising a dividing element for dividing said color value solid and said scanner signal solid into tetrahedral sub-solids by sets of standard color values and sets of standard scanner signals respectively, and wherein said sets of standard scanner signals are derived by converting said sets of standard color values by derivation from sets of reference scanner signals which surround said sets of standard scanner signals and define said scanner signal tetrahedral sub-solid, said converting based upon the relationship between said sets of standard color values and sets of reference color values which surround said sets of standard color values and define said color value tetrahedral sub-solid.

4. The device of claim 3 wherein said conversion element comprises a determining element for determining a scanner signal tetrahedral sub-solid which contains said first signal, and determining a color value tetrahedral sub-solid which corresponds to said scanner signal tetrahedral sub-solid and converting said first signal to a corresponding set of color values by derivation from sets of standard color values which define said color value tetrahedral sub-solid, said converting based upon the relationship between said first signal and sets of standard scanner signals which define said first signal tetrahedral sub-solid.

5. The device of claim 4 wherein said sets of color values are determined by a matrix conversion method.

6. The device of claim 3 wherein said sets of standard scanner signals are determined by a matrix conversion method.

7. The device of claim 1 wherein said conversion element is a look-up table which receives inputs from said scanner of said first signal and which outputs corresponding said set of color values.

8. The device of claim 1 wherein said conversion element comprises,
a dividing element for dividing said color value solid and said scanner signal solid into sub-solids by sets of standard color values and sets of standard scanner signals respectively,
a determining element for determining a scanner signal sub-solid which contains said first signal, and determining a color value sub-solid which corresponds to said scanner signal sub-solid and converting said first signal to a corresponding set of color values by derivation from sets of standard color values which define said color value sub-solid, said converting based upon the relationship between said first signal and sets of standard scanner signals which define said scanner signal sub-solid.

9. The device of claim 8 wherein said sub-solids have tetrahedral shapes.

10. The device of claim 9 wherein said sets of color value are determined by a matrix conversion method.

11. The device of claim 8 wherein said sub-solids have cubic shapes.

12. The device of claim 1 wherein some of said sets of reference color values are obtained by interpolating from other sets of reference color values, and some of said sets of reference scanner signals are obtained by interpolating from other sets of reference scanner signals.

13. The device of claim 1 wherein the colors are primary colors or colors close to the primary colors.

14. The device of claim 13 wherein the number of color patches in each direction corresponds to the number of steps in a corresponding step wedge.

15. The device of claim 14 wherein there are at least two steps in each direction.

16. The device of claim 14 wherein there are 3 to 9 steps in each direction.

17. The device of claim 1, wherein said reproducing is carried out by an electric photographic copy machine having a photosensitive image retainer, and
wherein said outputs cause said retainer to form a latent image.

18. The device of claim 1, wherein said reproducing is carried out by processing a silver halide color photographic light-sensitive material having silver halide grains, and
wherein said outputs sensitize said silver halide grains.

19. The device of claim 1, wherein said reproducing is displayed on a cathode ray tube, and
wherein said outputs are stimulating beams.

20. The device of claim 1, wherein said reproducing is carried out by printing which comprises colored dots, and
wherein said outputs define size of said colored dots.

21. A method of reproducing a color image from an original, said method comprising:
(a) preparing color patches;
(b) obtaining a plurality of sets of reference color values and a plurality of sets of reference scanner signals by measuring each of said color patches, successively;
(c) determining a plurality of sets of standard scanner signals in a signal gamut of said sets of reference scanner signals by interpolation based on said sets of reference scanner signals, said sets of standard scanner signals outside of said signal gamut being determined by extrapolation of said sets of standard scanner signals determined by interpolation of said sets of standard scanner signals;
(d) storing a plurality of standard scanner signals, in a scanner signal memory;
(e) determining a plurality of sets of standard color values corresponding to said sets of standard scanner signals in said signal gamut of said sets of reference scanner signals by interpolation based on a plurality of sets of reference color values obtained by measuring said color patches with a colorimeter and corresponding said reference color values to said sets of reference scanner signals and said sets of standard scanner signals encompassed by said sets of reference scanner signals and determining said set of standard color values corresponding to said sets of standard scanner signals outside of said signal gamut by extrapolation based on said sets of standard color values determined by said sets of reference color values and said sets of standard scanner signals;
(f) storing a plurality of sets of standard color values in a color value memory;
(g) scanning said original with a scanner to produce a first signal;
(h) converting said first signal to a second signal corresponding to said sets of standard scanner signals;
(i) converting said second signal to a color value represented by said sets of standard color values based on a correspondence between said sets of standard scanner signals stored in said scanner signal memory and said sets of standard color values stored in said color value memory; and
(j) reproducing said color image of said original based on said sets of color values.

22. The method of claim 21 wherein said color value solid and said scanner signal solid are divided into tetrahedral sub-solids by sets of standard color values and sets of standard scanner signals respectively, and wherein said sets of standard scanner signals is derived by converting said sets of standard color values by derivation from sets of reference scanner signals which surround said sets of standard scanner signals and define said scanner signal tetrahedral sub-solid, said converting based upon the relationship between said sets of standard color values and sets of reference color values which surround said sets of standard color values and define said color value tetrahedral sub-solid.

23. The method of claim 22 wherein said converting said set of scanner signals to a corresponding set of color values comprises
determining a scanner signal tetrahedral sub-solid which contains said first signal,
determining a color value tetrahedral sub-solid which corresponds to said scanner signal tetrahedral sub-solid and converting said first signal to a corresponding set of color values by derivation from sets of standard color values which define said color value tetrahedral sub-solid, said converting based upon the relationship between said first signal and sets of standard scanner signals which define said scanner signal tetrahedral sub-solid.

24. The method of claim 23 wherein said sets of color values are determined by a matrix conversion method.

25. The method of claim 22 wherein said first signal is determined by a matrix conversion method.

26. The method of claim 21 wherein said converting said first signal to a corresponding set of color values is carried out by a look-up table which inputs said set of scanner signals and which outputs said set of color values.

27. The method of claim 21 wherein said converting said first signal to a corresponding set of color values comprises,
    dividing said color value solid and said scanner signal solid into sub-solids by sets of standard color values and sets of standard scanner signals respectively,
    determining a scanner signal sub-solid which contains said set of scanner signals,
    determining a color value sub-solid which corresponds to said scanner signal sub-solid and converting said set of scanner signals to a corresponding set of color values by derivation from sets of standard color values which define said color value sub-solid, said converting based upon the relationship between said first signal and sets of standard scanner signals which define said scanner signal sub-solid.

28. The method of claim 27 wherein said sub-solids have tetrahedral shapes.

29. The method of claim 28 wherein said sets of color value are determined by a matrix conversion method.

30. The method of claim 27 wherein said sub-solids have cubic shapes.

31. The method of claim 21 wherein some of said sets of reference color values are obtained by interpolating from other sets of reference color values, and some of said sets of reference scanner signals are obtained by interpolating from other sets of reference scanner signals.

32. The method of claim 21 wherein the colors are primary colors or colors close to the primary colors.

33. The method of claim 32 wherein the number of color patches in each direction corresponds to the number of steps in a corresponding step wedge.

34. The method of claim 33 wherein there are at least two steps in each direction.

35. The method of claim 34 wherein there are 3 to 9 steps in each direction.

36. The method of claim 21 wherein said reproducing is carried out by an electric photographic copy machine having a photosensitive image retainer, and
    wherein said outputs cause said retainer to form a latent image.

37. The method of claim 21, wherein said reproducing is carried out by processing a silver halide color photographic light-sensitive material having silver halide grains, and
    wherein said outputs sensitize said silver halide grains.

38. The method of claim 21, wherein said reproducing is displayed on a cathode ray tube, and
    wherein said outputs are stimulating beams.

39. The method of claim 21 wherein said reproducing is carried out by printing which comprises colored dots, and
    wherein said outputs define size of said colored dots.

* * * * *